United States Patent [19]
Forrest et al.

[11] Patent Number: 5,823,590
[45] Date of Patent: Oct. 20, 1998

[54] ADJUSTABLE LENGTH GRABBER

[76] Inventors: Bradley A. Forrest, 14809 Summit Oaks Dr.; Jack E. Hubbard, 14721 Summit Oaks Dr., both of Burnsville, Minn. 55337

[21] Appl. No.: 821,358

[22] Filed: Mar. 20, 1997

[51] Int. Cl.⁶ ........................................... B25J 1/00
[52] U.S. Cl. ............................ 294/19.1; 294/24; 294/104
[58] Field of Search ............................. 294/11, 19.1, 22, 294/23, 24, 50.9, 100, 104, 115

[56] References Cited

U.S. PATENT DOCUMENTS

| | | | |
|---|---|---|---|
| 986,771 | 3/1911 | Siegel | 294/22 |
| 2,507,655 | 5/1950 | Welshans et al. | 294/19.1 |
| 3,591,226 | 7/1971 | Elmore, Jr. et al. | 294/19.1 |
| 4,160,563 | 7/1979 | Whitney | 294/19.1 |
| 4,547,010 | 10/1985 | Camp | 294/50.9 |
| 4,613,179 | 9/1986 | Van Zelm | 294/19.1 |
| 4,930,824 | 6/1990 | Matthews et al. | 294/19.1 |
| 5,324,086 | 6/1994 | Hammer | 294/19.1 |
| 5,524,946 | 6/1996 | Thompson | 294/104 |
| 5,618,075 | 4/1997 | Baziuk | 294/19.1 |

FOREIGN PATENT DOCUMENTS

| | | | |
|---|---|---|---|
| 849366 | 9/1960 | United Kingdom | 294/19.1 |
| 2081170 | 2/1982 | United Kingdom | 294/19.1 |

*Primary Examiner*—Dean Kramer
*Attorney, Agent, or Firm*—Schwegman, Lundberg, Woessner & Kluth, P.A.

[57] ABSTRACT

An adjustable length pole has an attachment with at least two fingers which are moveable to provide gripping force. In one embodiment, the fingers are opposed digits which are moveable toward each other to a closed position. The fingers are hinged, and at least one of the fingers is attached to a cord which is operable to move an end of the finger toward an end of the other finger. In a further embodiment, a spring is provided to bias the fingers in an open position. The cord is threaded through the middle of the telescoping pole to help prevent it from becoming tangled in tree branches. Further, a portion of the cord comprises a spring mechanism such as an elastic material to enable a user to set a desired tension for the fingers. Hooks are provided on the telescoping pole to secure the cord and allow two handed manipulation of the pole while the fingers retain desired tension on an object to be moved.

6 Claims, 2 Drawing Sheets

ADJUSTABLE LENGTH GRABBER

FIELD OF THE INVENTION

The present invention relates to tools used to reach out of reach objects, and in particular to a variable length tool having a controllable grabber.

BACKGROUND OF THE INVENTION

Reaching and manipulating high objects has always been a problem for people both short and tall. Many tools have been used, including telescoping poles having various attachments designed for particular uses. These attachments have included spring loaded baskets for replacing light bulbs, dusters, and saw blades and cord activated pruning shears for trimming high branches in trees and bushes.

None of these has proven particularly useful for hanging decorations in high places or retrieving items stuck in high places such as trees or a roof. There has been a great resurgence in recent years in decorating trees with lighting and other ornamentation. Many exterior decorators use fixed length poles with some sort of hook that they have cobbled together. Others have tried to use their telescoping poles with various attachments with mixed results. The saw attachment has the ability to grab electric light cords to effectively pull them down from trees. Such efforts may prove very dangerous if the cords are still plugged in. Light bulb replacement attachments suffer from the lack of any feature with which to grab or effectively support the cords, making it very tricky to accurately place the lighting cords or other decoration. Other decorators have used ladders with varying success. Ladders are ineffective when trying to reach tops of most trees, since lower branches prevent placement of the ladder in a position convenient to directly reach interior upper branches. Some decorators resort to climbing the trees in winter under dangerous icy conditions.

There is a need for a tool which can be used to accurately and effectively place decorations and other ornamentation in high and hard to reach positions without endangering human life. There is a further need for a tool which provides the ability to gently grab delicate decorations and lift them to desired spots. There is yet a further need for a tool which can retrieve objects trapped in high places, such as a kite in a tree or a toy glider on a roof without endangering the user of the tool.

SUMMARY OF THE INVENTION

A variable length pole is provided with an attachment having at least two fingers which are moveable to provide gripping force. In one embodiment, the fingers are opposed digits which are moveable toward each other to a closed position. The fingers are hinged, and at least one of the fingers is attached to a cord which is operable to move an end of the finger toward an end of the other finger. In a further embodiment, a spring is provided to bias the fingers in either an open or closed position.

In yet a further embodiment, the cord is threaded through the middle of a telescoping pole to help prevent it from becoming tangled in tree branches. Further, a portion of the cord comprises a spring mechanism such as an elastic material to enable a user to set a desired tension for the fingers. Hooks are provided on the telescoping pole to secure the cord and allow two handed manipulation of the pole while the fingers retain desired tension on an object to be moved.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims.

Figure 1:
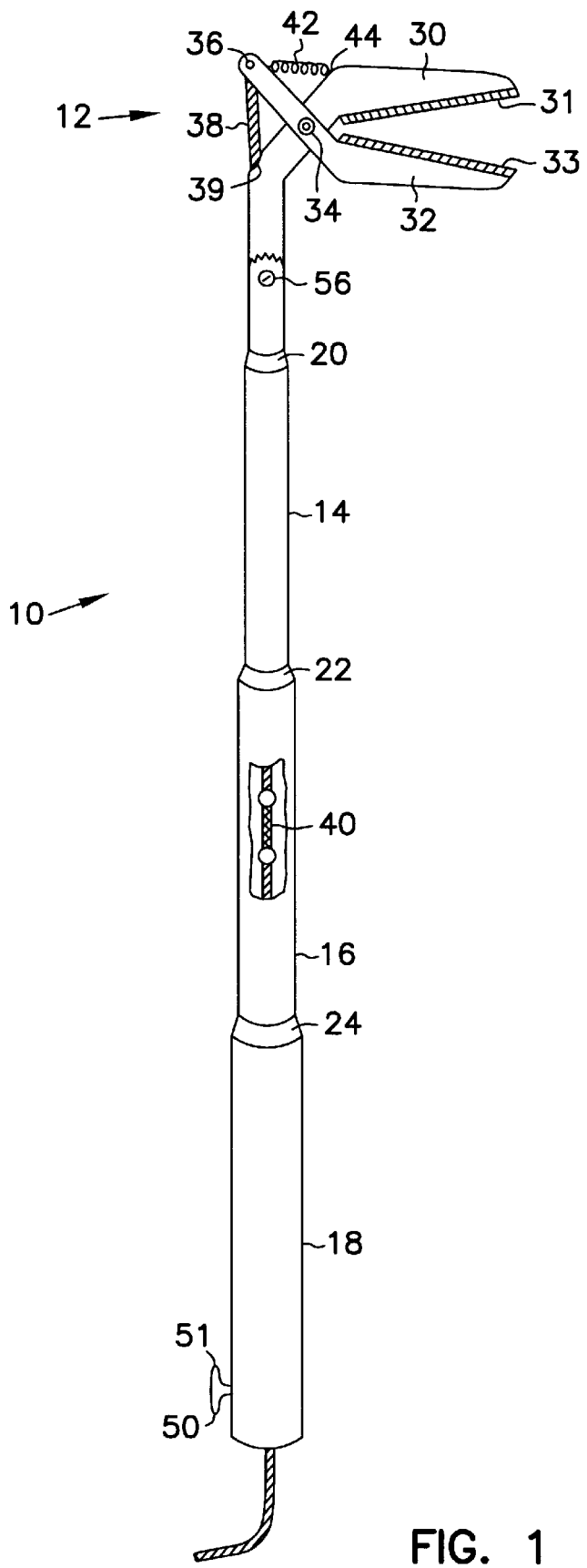
FIG. 1 is a partially cut away front perspective view of a grabbing device on a telescoping pole.

A telescoping pole 10 coupled to a grabber attachment 12 is shown in FIG. 1. The telescoping pole 10 comprises a series of varying diameter hollow pole sections 14, 16 and 18 with pole section 14 fitting within pole section 16, which fits within pole section 18. The pole sections are adjustably coupled together by combinations of threaded ring and split washer combinations 22 and 24. The threaded ring and split washer combinations 22 and 24 are of common design, preferably heavy duty plastic, and permit the poles 14, 16 and 18 to be adjusted between being fully extended and telescoped to a short length in a well known manner. There are may other types of fasteners which could be used to provide an adjustable or variable length pole for holding the grabber attachment. Each pole is preferably between 6 and 8 feet in length to allow a total extension of between about 18 and 24 feet. This height, coupled with the height of a typical person would allow a reach of up to about 30 feet. In further embodiments, longer pole sections and/or additional pole sections may be utilized, but the length is limited by desired strength of the pole in its fully extended mode. The pole sections are typically made of high impact plastic with longitudinal ribs to provide additional strength. Other materials may also be used, such as aluminum and fiberglass. The pole segments can also be coupled by various sleeve and bolt type arrangements which enable varying the length of the pole to facilitate both storage and extension.

An end of pole section 14 comprises a threaded portion 20 for attachment of the grabber attachment 12 which contains a mating threaded portion shown in assembled position, also at 20. There are several other methods of attachment that may be used, including combinations of snap fit plastic protrusions and indentations and other known means. In yet a further embodiment, the grabber attachment may be permanently attached as by welding or adhesive.

The grabber attachment 12 comprises a first finger 30 having the mating threaded portion for direct attachment at 20. The first finger 30 extends straight from the pole 14 and then is bent at about a 45 degree angle for a middle section, and then bent again for an end section which is about perpendicular to pole section 14 in one embodiment. A rubber or poly pad 31 is provided on the perpendicular section of Finger 30. A second finger 32 also comprises a pad 33, and is coupled to first finger 30 at a hinge 34 to move in a manner such that the pads 31 and 33 are touching in a closed position for releasably gripping objects.

The second finger comprises an attachment feature 36 such as a hole for attachment of a cord 38. The cord, in one embodiment is a nylon cord and is threaded back through the first finger 30 which has a hole 39 therein, which may be coupled with a Teflon washer or coated with a material which does not fray the cord. The cord is then threaded through the point 20 where the first finger 30 attaches to the pole 14 and then down through the poles 14, 16 and 18 to help keep it from being tangled in branches or other obstacles. A portion of the cord 40 may be formed of an elastic material similar to a bungee cord. In one embodiment, the cord itself is woven to provide a desired amount of elasticity. In a further embodiment, the cord is simply attached to the second finger at 36 and left hanging for a user to grab as desired. In this embodiment, the cord is not threaded through the poles.

A light spring 42 is coupled between the end of the second finger 32 close to the cord attaching point 36 and the beginning of the end section of the first finger at 44. Holes or hooks may be formed in the fingers to facilitate attachment of the light spring 42. The spring operates to bias the padded portions of the fingers away from each other in an open position. Pulling on the cord causes the padded portions of the fingers to close toward each other to the closed position. The elastic portion 40 the cord 38 provides a selectable tension, and also allows the cord to be tied off on opposed hooks 50 and 51 while still maintaining tension on the padded portions of the fingers. In a further embodiment, a means for tying off the cord 38 comprises opposed spring loaded latches as found on sail boats which allows for quickly securing and releasing the cord.

In a further embodiment, the first finger 30 is provided with a hinge or swivel 56 which may be adjusted to provide different angles for the opposed gripping fingers 30 and 32. As shown, the fingers are substantially perpendicular to the pole sections. With adjustment of the hinge 56 which may have opposed teeth and a wing nut and bolt combination, the fingers may be moved in either direction about the perpendicular position. This is very useful when reaching for an item in a tight fitting environment since the fingers 30 and 32 may function more like a needle nosed pliers when angled up, almost in line with the pole sections. Similarly, angling them down may allow reaching over an edge to retrieve something from inside of a rain gutter or similar obstacle.

Figure 2:
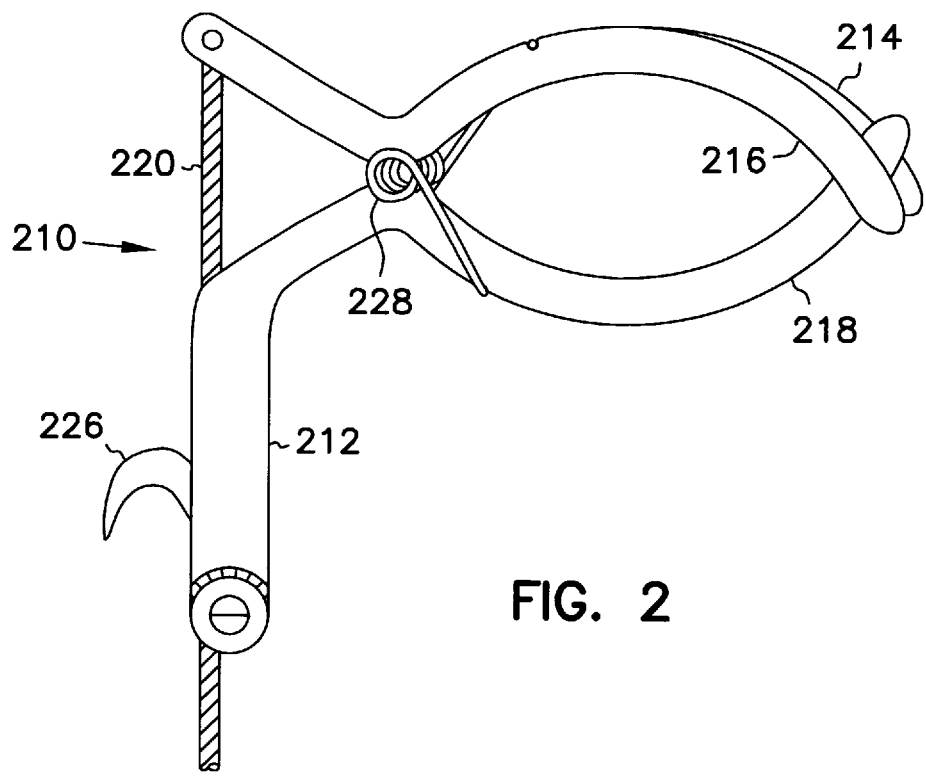
FIG. 2 is a perspective view of an alternative grabbing device.

In FIG. 2, an alternative attachment is shown generally at 210. A first finger 212 is threaded at one end for attachment to a pole. A second finger 218 is coupled to the first finger as by a spring 228, which operates much like a clothes pin to both grip the fingers with ends of the spring, and hold them in a closed relationship. Detentes in both fingers are formed to hold a main coil of the spring in position. Additional detentes are formed on the outsides of the fingers and spaced from the main coil of the spring to mate with the ends of the spring to apply the spring force to the fingers. A second end of the second finger 218 comprises a pair of spaced apart fingers 214 and 216. The spaced apart finger 214 and 216 are curved as shown, forming a gentle arc. The second finger is also curved in an opposite direction to that of the first finger, and is coupled to a cord 220. The first finger is positioned to fit between the spaced apart finger 214 and 216 when in a closed position. The spring, by holding the fingers in a closed relationship, allows for griping and manipulating objects without concern for the holding onto the cord 220. This enables a user to focus more on the task of proper placement of objects, rather than using the cord to enable gripping them. Many elements could be used to perform the spring function, including forming the fingers from a single piece of resilient material. The spring can be made of metal or plastic or other materials with desired spring constants which are sufficient to grip desired objects.

A projection 226 is coupled to the first or second finger and curves back toward the threaded portion of the first finger, extending toward an end of the pole normally held by a user. The projection 226 may be used to engage a string of decorative lights for application of a downward pulling force. It is useful when a hard downward force is desired to be applied to an object without damaging the longer fingers. The fingers may also be coated with a resilient material such that they do not harm delicate objects to be manipulated.

The present invention provides many advantages over prior art methods of reaching high positions and manipulating objects at such positions. The variable tension gripping force obtainable provides the ability to gently grip objects with desired force and two handed operation of the pole. It is useful for holiday decorations from placing ornaments on trees to putting up strings of lights. It is also quite useful in retrieving objects that are stuck in high places, such as kites without damaging them.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A variable length grabber comprising:

a telescoping pole;

a first finger coupled to a first end of the pole;

a second finger moveably coupled to the first finger for releasably gripping an object in a closed position with respect to the first finger wherein the first and second fingers each comprise a pad for contacting items to be grabbed, the pads being in contact with each other when the first and second fingers are in the closed position, wherein an angle between the pole and the fingers in the closed position may be operatively varied between zero and at least 180 degrees;

a spring coupled to the second finger for biasing the second finger in one of an open or closed position with respect to the first finger; and a cord coupled to the second finger for controlling movement of the second finger between the closed position and the open position, at least a portion of the cord comprising an elastic material.

2. The variable length grabber of claim 1 wherein the pole further comprises means for securing the cord.

3. The variable length grabber of claim 1 wherein one of the first and second fingers comprises a projection extending toward a second end of the pole.

4. The variable length grabber of claim 1 wherein the first finger comprises a pair of spaced apart substantially parallel fingers, and wherein the second finger is positioned to move between the first finger fingers in the closed position.

5. The variable length grabber of claim 1 wherein the first finger is removably coupled to the first end of the pole.

6. The variable length grabber of claim 1 wherein the first finger comprises a swivel joint.

\* \* \* \* \*